(12) United States Patent
Pawlowski

(10) Patent No.: US 10,730,460 B2
(45) Date of Patent: Aug. 4, 2020

(54) VEHICLE CAB BODY FOR A VEHICLE

(71) Applicant: VOLVO TRUCK CORPORATION, Gothenburg (SE)

(72) Inventor: Artur Pawlowski, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 126 days.

(21) Appl. No.: 16/078,732

(22) PCT Filed: Mar. 23, 2017

(86) PCT No.: PCT/EP2017/056904
§ 371 (c)(1),
(2) Date: Aug. 22, 2018

(87) PCT Pub. No.: WO2017/162787
PCT Pub. Date: Sep. 28, 2017

(65) Prior Publication Data
US 2020/0122661 A1    Apr. 23, 2020

Related U.S. Application Data

(63) Continuation-in-part of application No. PCT/EP2016/056564, filed on Mar. 24, 2016.

(51) Int. Cl.
*B60J 7/00* (2006.01)
*B60R 16/04* (2006.01)
*B62D 33/06* (2006.01)

(52) U.S. Cl.
CPC ............. *B60R 16/04* (2013.01); *B62D 33/06* (2013.01)

(58) Field of Classification Search
CPC ... B62D 33/0604; B62D 35/001; B60R 21/11; B65F 2003/0279; B60P 3/07;
(Continued)

(56) References Cited

U.S. PATENT DOCUMENTS

| 6,285,160 B1 | 9/2001 | Tsai |
| 8,643,216 B2 * | 2/2014 | Lattin ............... H01M 10/0445 307/65 |

(Continued)

FOREIGN PATENT DOCUMENTS

| DE | 202015003010 U1 | 6/2015 |
| EP | 2712752 A1 | 4/2014 |

(Continued)

OTHER PUBLICATIONS

International Search Report dated Jun. 21, 2017 for corresponding International App. PCT/EP2017/056904.

*Primary Examiner* — Kiran B Patel
(74) *Attorney, Agent, or Firm* — Withrow & Terranova, PLLC

(57) ABSTRACT

A vehicle cab body for a vehicle includes a cab body structure including a roof structure, side wall structures, and a rear wall structure, wherein the vehicle cab body further includes a vehicle battery, wherein a portion of at least one of the roof structure, side wall structures, and rear wall structure forms at least a part of a housing for the vehicle battery. A vehicle and a vehicle battery arrangement are also provided.

23 Claims, 6 Drawing Sheets

(58) Field of Classification Search
CPC . Y02T 10/7005; Y02T 10/88; B60H 1/00428; H01M 2220/20; H01M 2/1077
See application file for complete search history.

(56) References Cited

U.S. PATENT DOCUMENTS

| | | | |
|---|---|---|---|
| 8,852,781 B2* | 10/2014 | Merriman | B23P 15/26 |
| | | | 429/120 |
| 9,440,525 B1* | 9/2016 | Baty | B60H 1/00428 |
| 9,557,100 B2* | 1/2017 | Chopko | B60H 1/3226 |
| 9,586,458 B2* | 3/2017 | Larson | B60H 1/00014 |
| 9,605,914 B2* | 3/2017 | Yum | H01M 10/6569 |
| 9,627,724 B2* | 4/2017 | Yum | H01M 10/613 |
| 9,755,198 B2* | 9/2017 | Blumka | H01M 2/1022 |
| 10,240,847 B1* | 3/2019 | Thomas, Jr. | F25D 11/003 |
| 2011/0222240 A1 | 9/2011 | Kawata et al. | |
| 2012/0037437 A1* | 2/2012 | Fernandez-Mateo | |
| | | | B60L 53/80 |
| | | | 29/700 |
| 2012/0048629 A1 | 3/2012 | Magens et al. | |
| 2013/0313860 A1 | 11/2013 | Yamaji et al. | |
| 2015/0188360 A1* | 7/2015 | Doane | H02J 7/35 |
| | | | 307/9.1 |
| 2017/0229691 A1* | 8/2017 | Loosen | H01M 2/1083 |

FOREIGN PATENT DOCUMENTS

| | | |
|---|---|---|
| EP | 2913252 A2 | 9/2015 |
| JP | H0752834 A | 2/1995 |
| JP | 2008174181 A | 7/2008 |
| WO | 2008156388 A1 | 12/2008 |

* cited by examiner

VEHICLE CAB BODY FOR A VEHICLE

BACKGROUND AND SUMMARY

The present invention relates to a vehicle cab body for a vehicle. The invention also relates to a vehicle comprising such vehicle cab body and a vehicle battery arrangement arranged to be connected to a cab body structure of the vehicle cab body. The invention is applicable on vehicles, in particularly low, medium and heavy duty vehicles commonly referred to as trucks. Although the invention will mainly be described in relation to a truck, it may also be applicable for other type of vehicles such as e.g. working machines, etc.

In the field of vehicles, in particularly low-, medium- and heavy duty vehicles commonly referred to as trucks, electrical components commonly receive electrical current from the vehicle battery. Also, the vehicle battery is arranged in conjunction with e.g. the starter motor of the vehicle in order to be able to start up the vehicle engine.

As vehicles continuously develop in order to fulfil the requirements and demands from the market, also the vehicle batteries develop in terms of, for example, increasing electrical storage capacity, life time, etc. For example, the desire to use more batteries and batteries with higher capacity within the vehicle increases.

However, a problem is that the area on the vehicle chassis at which the vehicle batteries are positioned is relatively densely packed with other chassis components. When developing batteries, the outer geometrical dimensions of the batteries must be within specific limits to be able to be connected to the chassis.

US 2011/0222240 describes an alternative positioning of the battery for a hybrid car. In US 2011/0222240 the battery is accommodated in a lower part of a luggage space behind a backseat of the car. However, heavy duty vehicles such as trucks do not have a corresponding luggage space and other alternatives for mounting the battery are thus desired.

WO 2008/156388 relates to a tractor for a tractor-trailer combination wherein an intermediate space is arranged at the rear wall. The intermediate space has a pre-selected center length less than 20 cm from the rear wall.

US 2012/0048629 relates to an industrial truck with a drive part which comprises an electrical drive.

It is desirable to provide a vehicle cab body which at least partially overcomes the deficiencies of the prior art.

According to a first aspect of the present invention, there is provided a vehicle cab body for a vehicle, the vehicle cab body comprising a cab body structure comprising a roof structure, side wall structures, and a rear wall structure, wherein the vehicle cab body further comprises a vehicle battery, wherein a portion of at least one of the roof structure, side wall structures, and rear wall structure forms at least a part of a housing for the vehicle battery.

The wording "cab body structure" should in the following and through nit the entire description be interpreted as a load carrying structure of the vehicle cab body. Such load carrying structure may be, as will also be described below in relation to example embodiments, a cab reinforcement structure such as e.g. one or more vehicle cab frame structures etc. Thus, the roof structure, side wall structures and rear wall structure should be understood as respective load carrying structures. The cab body structure may, for example, be a frame structure or the like which by itself houses the vehicle battery, as will be described further below.

The wording "cab body" should be understood to mean the volume formed by the outer surface of the cab and the inner walls and inner roof structure of the cab. Hence, the chassis and the engine compartment of the vehicle should not be construed as included in the cab body of the present disclosure.

Furthermore, it should be readily understood that the roof structure, side wall structures and the rear wall structure are to be seen in the longitudinal direction of the vehicle. Accordingly, the rear wall structure is arranged behind an operator and the vehicle seats in the vehicle cab compartment.

An advantage of the present invention is that by positioning the vehicle battery in the cab body structure instead of in the engine compartment or connected to the chassis of the vehicle is that additional space becomes available in the relatively occupied cab interior, chassis or engine compartment. Also, by at least partially housing the vehicle battery by means of the cab body structure, a protective structure for the vehicle battery is formed which makes the vehicle battery less prone to external damage. Furthermore, since there is a relatively large available space in the cab body structure for the vehicle batteries, an increased amount of batteries may be provided for the vehicle. Hereby, the vehicle battery capacity may be increased in comparison to providing the battery in the engine compartment or connected to the chassis. Further, the invention allows for that the wiring to battery power consumers may be reduced since the battery can be placed more close to these power consumers.

Furthermore, by arranging the vehicle battery in the cab body structure enables for simplified assembly/disassembly of the vehicle battery since the battery may be accessible from outside of the vehicle cab body. This may be realized by arranging openings in the cab body structure which are accessible from an outside position of the vehicle cab. Hereby, simplified assembly/disassembly, as well as battery maintenance, is provided. The vehicle battery may be accessible by either tilting the vehicle cab body or from a non-tilted position of the vehicle cab body.

According to an example embodiment, the cab body structure may comprise a cab reinforcement structure forming at least a part of a housing for the vehicle battery. The part of the housing may refer to at least one wall of the reinforcement structure directly or indirectly adjacent to the battery, or preferably at least two or more walls directly or indirectly adjacent to the battery. In a preferred embodiment, the battery is positioned inside a reinforcement structure.

The cab reinforcement structure may be a hollow or tubular reinforcement frame structure arranged to house the vehicle battery, such that e.g. a battery box is provided for the vehicle battery. The reinforcement frame structure may be formed by one or a plurality of sub-components. By means of the cab reinforcement structure the vehicle battery may be housed in a relatively high-strength arrangement which can protect the vehicle battery from external damage. Furthermore, the vehicle battery may form part of the reinforcement structure together with the cab body structure, thus further increasing the mechanical strength thereof.

According to an example embodiment, the cab reinforcement structure may be a vehicle cab frame structure arranged on at least one of the roof structure, the side wall structures and the rear wall structure, wherein the vehicle battery is at least partially housed within the vehicle cab frame structure.

The cab frame structure may hence be the so-called A-pillar, B-pillar or C-pillar of the vehicle cab body. The cab frame structure may also be a horizontal reinforcing cross-member of the cab body. Hereby, available and relatively high-strength frame structures of the vehicle cab body can be used for at least partially housing the vehicle battery. Hence, the vehicle battery may be at least partly housed by either one of the A-pillar, B-pillar, C-pillar, and/or horizontal reinforcing cross-member.

According to an example embodiment, a lid may be provided for encapsulating the vehicle battery within the cab body structure.

Hereby, the lid may form a protective arrangement for the vehicle battery. The lid may be arranged at an end portion of the vehicle battery for encapsulation of the battery in the cab body structure. The lid may also form part of the cab reinforcement structure or vehicle cab frame structure, i.e. the lid is in such case a load carrying lid. An advantage is thus that the vehicle battery can be completely protected from the external environment.

According to an example embodiment, the vehicle cab body may further comprise at least two cab reinforcing structures, wherein the vehicle battery is at least partly housed between the at least two cab reinforcing structures, such as vehicle cab frame structures.

An advantage is that a relatively large battery may be used, which battery is mechanically connected to the at least two vehicle cab frame structures. Hence, the at least two cab frame structures partially house a respective portion of the vehicle battery.

According to an example embodiment, the vehicle battery may be at least partly housed between the at least two vehicle cab frame structures on the rear wall of the vehicle.

According to an example embodiment, the vehicle battery may be arranged in the roof structure of the cab body structure.

An advantage is that electrical power consumers arranged in, or in the vicinity of, the roof structure of the vehicle can be powered by these batteries. Hence, the vehicle batteries are arranged relatively close in space to the electrical power consumers and electrical wiring to these electrical power consumers can be reduced.

According to an example embodiment, the vehicle battery may be arranged in at least one of the side wall structures.

Hereby, the center of gravity is affected positive in terms of providing improved vehicle drivability.

According to an example embodiment, the vehicle battery may be arranged in the rear wall structure.

Positioning the vehicle battery in the rear wall structure may reduce the front axle load of the vehicle since the center of gravity is moved further rearward of the vehicle. Further, the accessibility to the vehicle battery may be improved since the rear wall structure can be accessed regardless of the type of vehicle used.

According to an example embodiment, the vehicle cab body may comprise a vehicle battery arrangement comprising the vehicle battery, the vehicle battery arrangement comprising at least one connection pin and the cab reinforcement structure comprises a recess portion, wherein the vehicle battery arrangement is connected to the cab reinforcement structure by connection of the connection pins into the recess portion.

According to an example embodiment, the vehicle cab body may comprise a vehicle battery arrangement comprising the vehicle battery, the vehicle battery arrangement comprising a protruding portion at a first end portion thereof, wherein the protruding portion is connecting the vehicle battery to a recess portion arranged at an inner portion of the cab reinforcement structure.

The protruding portion of the vehicle battery arrangement and the recess portion arranged at the inner portion of the cab reinforcement structure may form a grounding connection for the vehicle battery, or plus/minus connection of the vehicle battery. It may also form a mechanical connection for the vehicle battery for sufficiently holding the battery in its desired position, as also described below. An advantage of the protruding portion of the vehicle battery arrangement in conjunction with the recess portion arranged at the inner portion of the cab reinforcement structure is also that a first form fit connection between the vehicle battery and the cab reinforcement structure is provided. Hereby, a first well defined mechanical connecting portion for the vehicle battery is provided. It should however be readily understood that the vehicle battery arrangement may equally as well comprise a recess portion for connection to a protruding portion arranged at the inner portion of the cab reinforcement structure.

According to an example embodiment, the vehicle cab body may comprise a battery arrangement comprising the vehicle battery, wherein the vehicle battery arrangement comprises a battery holder at a second end portion thereof, the battery holder being arranged to mechanically couple the vehicle battery to the cab body structure. Hereby, a second connection to the cab body structure is provided.

According to an example embodiment, the vehicle battery arrangement may comprise a protruding portion at the second portion thereof, wherein the protruding portion at the second portion is connecting the vehicle battery to a recess portion of the battery holder. Hereby, the risk of damaging both of the protruding portions of the battery is reduced as they are not positioned in the vicinity of each other.

According to an example embodiment, the vehicle battery may comprise a first guiding means at an end portion facing the battery holder, wherein the battery holder comprises a second guiding means at a surface facing the first guiding means, wherein the first and second guiding means have corresponding shapes for allowing connection there between.

Hereby, when e.g. replacing the vehicle battery, the guiding means assures that the battery is correctly positioned in the battery bolder. Hence, simplified assembling of the battery is provided. Also, if the vehicle battery fails to fit the guiding means of the battery holder, it can be determined that an incorrect battery is used. A further advantage is thus that it is assured that a correct and approved battery is used. As a non-limiting example, the first guiding means may be arranged in a concave shape and the second guiding means may be arranged in a convex shape, which concave and convex shape have corresponding dimensions for allowing connection there between. Other shapes of the first and second guiding means are of course conceivable. The wording "facing" should thus be understood to mean when the vehicle battery is connected to the battery holder.

According to an example embodiment, the battery holder way comprise at least one flexible flange, wherein the vehicle battery is connected to the battery holder by means of the at least one flexible flange.

Hereby, the flexible flange may be arranged as a spring arrangement for of holding the battery connected to the battery holder. Hence, the flexible flange may have spring characteristics which mean that the flexible flange exerts a compression force to the vehicle battery when the vehicle battery is connected to the battery holder. Also, using a flexible flange removes the necessity of using bolts or screws to connect the battery to the battery holder. Hence, a simplified connection to the battery holder is provided.

According to an example embodiment, the vehicle battery may comprise a recess portion at a second end portion of the vehicle battery for providing a form fit between the recess portion and the at least one flexible flange.

A form fit between the second end portion of the battery and the battery bolder further improves the connectability between the battery and the battery holder, which improves the connection there between.

According to an example embodiment, the vehicle battery may be a solid state battery.

An advantage is that these types of batteries have an improved usage safety since they are not sensitive to a specific positioning, i.e. they can be positioned either horizontally or vertically, or in any position there between. The battery is thus especially beneficial to use for the specific application of the present application. According to a non-limiting example, the solid state battery may be a Lithium Iron Phosphate battery, although other alternatives are conceivable.

According to a second aspect, there is provided a vehicle comprising a vehicle cab body according to any of the above example embodiments described in relation to the first aspect of the present invention.

According to an example embodiment, the vehicle may be a heavy duty vehicle, preferably a truck.

Effects, and features of the second aspect are largely analogous to those described above in relation to the first aspect of the present invention.

According to a third aspect, there is provided a vehicle battery arrangement comprising a vehicle battery, wherein the vehicle battery arrangement comprises connecting means for connecting the vehicle battery arrangement to a portion of a cab body structure of a vehicle cab body.

Hereby, a battery arrangement is, provided which beneficially can be used and mechanically connected to a portion of the cab body structure.

According to an example embodiment, the vehicle battery arrangement may comprise a protruding portion at a first end portion thereof, wherein the protruding portion is arranged to connect the vehicle battery to a recess portion arranged at an inner portion of the cab body structure. The protruding portion and the recess portion may form a mechanical connection holding the vehicle battery in position. Alternatively, or additionally, the protruding portion and recess portion may form an, electrical connection for the vehicle battery. Hereby, the recess portion can be connected to cables for delivery of electrical current to power consumers of the vehicle.

According to an example embodiment, the vehicle battery arrangement may further comprise a battery holder at a second end portion thereof, the battery holder being arranged to mechanically couple the vehicle battery to the cab body structure.

According to an example embodiment, the vehicle battery may comprise a first guiding means at an end portion facing the battery holder, wherein the battery holder comprises a second guiding means at a surface facing the first guiding means, wherein the first and second guiding means have corresponding shapes for allowing connection there between.

According to an example embodiment, the battery holder may comprise at least one flexible flange, wherein the battery is connected to the battery holder by means of the at least one flexible flange.

According to an example embodiment, the vehicle battery may comprise a recess portion at a second end portion of the battery for providing a form fit between the recess portion and the at least one flexible flange.

Further effects and features of the third aspect are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional features and advantages of the present invention, will be better understood through the following illustrative and non-limiting detailed description of a exemplary embodiments of the present invention, wherein.

DETAILED DESCRIPTION

Figure 1:
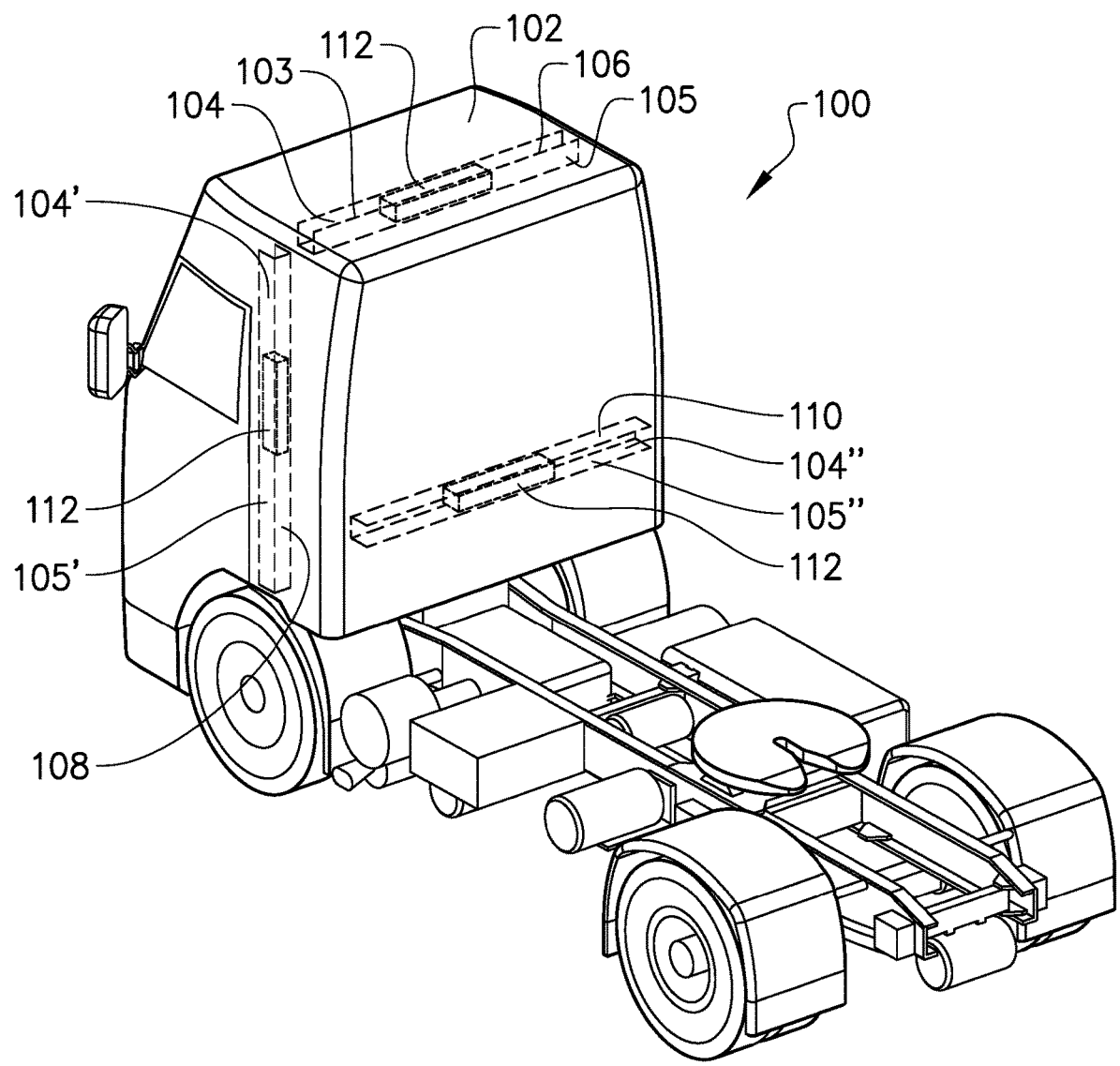
FIG. 1 is a perspective view from behind of a vehicle comprising cab body according to an example embodiment of the present invention.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Reference is made to FIG. 1 which is a perspective view of a vehicle 100 comprising a vehicle cab body 102 in which an operator of the vehicle., i.e. a vehicle driver, can operate the vehicle 100. As illustrated in FIG. 1, the vehicle 100 is a truck which can be provided with a trailer if desirable. As further illustrated in FIG. 1, the vehicle cab body 102 comprises a vehicle cab body structure 103 comprising a cab reinforcement structure 104, 104', 104". The cab reinforcement structure 104, 104', 104" is in the illustrated embodiment a vehicle cab frame structure 105, 105', 105" arranged on the roof structure 106, side wall structure 108 and rear wall structure 110, respectively.

Although FIG. 1 only illustrates one vehicle cab frame structure 105, 105', 105" on each of the roof structure 106, side wall structure 108 and rear wall structure 110, it should be readily understood that each of the roof structure 106, side wall structure 108 and rear wall structure 110 may comprise more cab frame structures. Only one cab frame structure is illustrated for each of the roof structure 106, side wall structure 108 and rear wall structure 110 for simplicity of understanding the invention.

Furthermore, the cab body 102 comprises at least one vehicle battery 112. The vehicle battery 112 is the battery supplying electrical current to various electrical components or electronically controlled components of the vehicle, such as e.g. the radio, the lamps, actuators, or the starter motor off vehicle engine, etc. Hence, the vehicle battery 112 depicted in FIG. 1 corresponds to a vehicle battery normally housed in the engine compartment or connected to the chassis of the vehicle 100.

As depicted in FIG. 1, the vehicle battery 112 is housed in each of the cab frame structures of the roof structure 106, side wall structure 108 and rear wall structure 110. This arrangement merely for illustrative purposes and it should be noted that the present invention may position a vehicle battery in only one of the roof structure 106, side wall structure 108 and rear wall structure 110. Also, the cab frame structure of, for example, the side wall structure 108 may house more than one vehicle battery 112, such as two or more vehicle batteries. Also, the vehicle battery 112 may be arranged between the cab frame structures of e.g. the rear wall structure 110. Hereby, the vehicle battery 112 is connected to at least two cab frame structures of the rear wall structure 110. The vehicle battery 112 may thus be positioned behind the rear wall, or connected to the rear wall with a lid or the like protecting the vehicle battery from external damage. The rear wall may thus be formed with a recess portion which, together with the cab frame structures of the rear wall, at least partly houses the vehicle battery 112.

Figure 2:
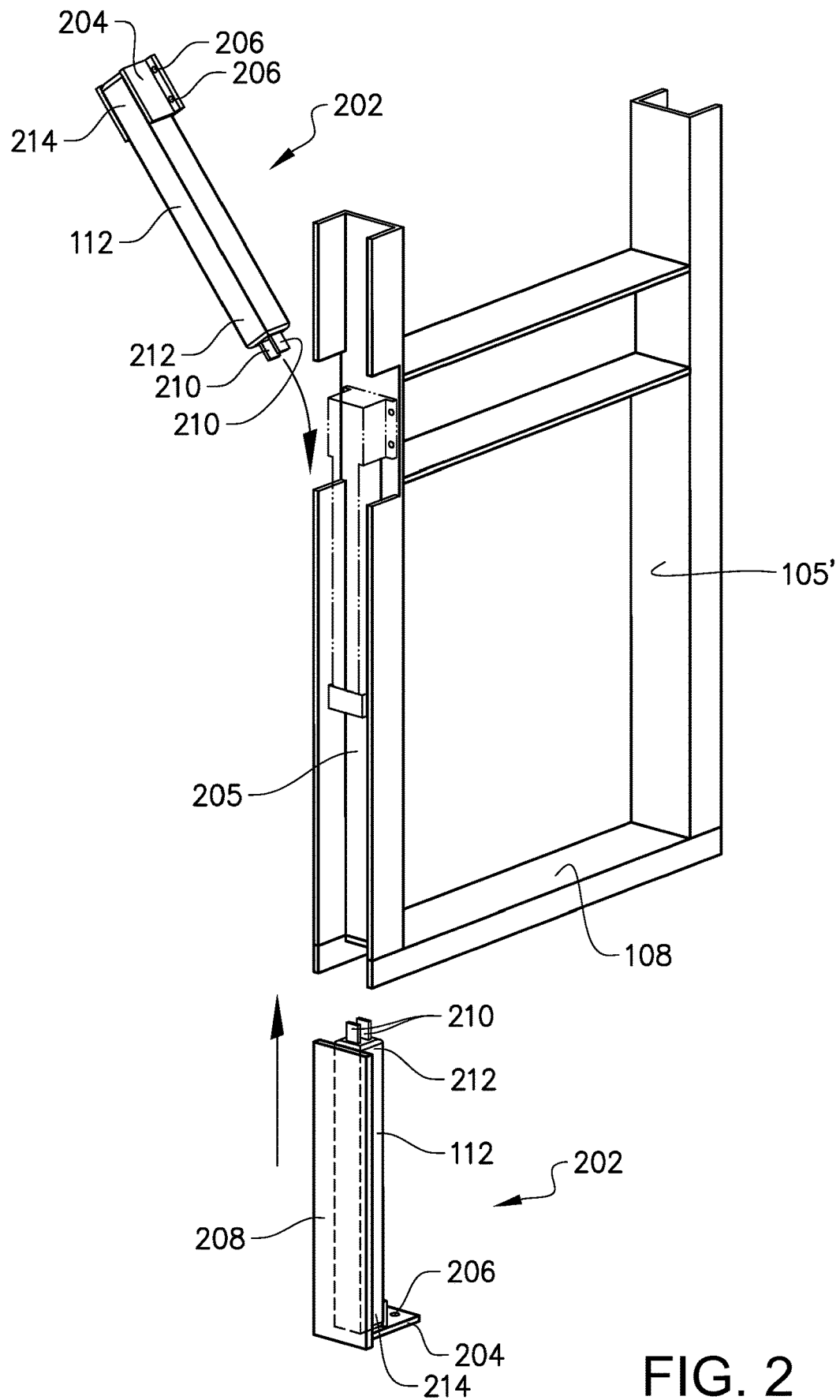
FIG. 2 is a perspective view of an example embodiment of a frame structure of the side wall structure, or the rear wall structure, of the vehicle in which a vehicle battery can be arranged.

Turning to FIG. 2, which is a perspective view of an example embodiment of the cab frame structure 105' of the side wall structure 108 of the vehicle 100. As depicted in FIG. 2, a vehicle battery arrangement 202 comprising the above described vehicle battery 112 is connected to a vertical cab frame structure 205 of the side wall structure 108. Hereby, the vehicle battery 112, when positioned in the vertical cab frame structure 205, is at least partially housed within the vertical cab frame structure 205.

In the illustrated embodiment depicted in FIG. 2, one battery arrangement 202 is connected to the vertical cab frame structure 205 from above, and one battery arrangement 202 is connected to the vertical cab frame structure 205 from below. The battery arrangement 202 connected to the vertical cab frame structure 205 from above is illustrated in its assembled position in dashed lines in FIG. 2.

The vehicle battery arrangement 202 further comprises a battery holder 204 for holding the vehicle battery 112. The battery holder 204 can be connected to the cab frame structure by means of screw or bolts (not shown) arranged through bolt holes 206 of the battery holder 204 and corresponding bolt holes (not shown) in the cab frame structure. Further details of the battery holder 204 and its connection to the vehicle battery 112 will be given below in relation to the description of FIGS. 4a and 4b.

Moreover, the vehicle battery arrangement 202 can further comprise a lid 208. The lid 208, which is illustrated in the battery arrangement 202 connected to the vertical cab frame structure 205 from below, is arranged in parallel with the vehicle battery 112. Hereby, when the vehicle battery arrangement 202 is connected to the cab frame structure, the vehicle battery 112 can be completely encapsulated by the U-shaped cab frame structure and the lid 208. The present invention should not be limited to a lid 208 as depicted in FIG. 2. Other alternatives are also conceivable. For example, if the vehicle battery is connected to a T-shaped-cab frame structure, then the lid 208 may take an L-shaped form or the like in order to encapsulate the vehicle battery 112. Furthermore, as described above, the vehicle battery 112 can be connected to two cab frame structures. In such a case, the lid 208 may be larger in size and also connected to at least the two cab frame structures. The lid may in such case form part of the cab frame structure. Hence, the lid is thus arranged as a load carrying structure.

The vehicle battery arrangement 202 also comprises a protruding portion 210 in the form of a ground terminal for the vehicle battery. The protruding portion 210 is arranged on a first end portion 212 of the vehicle battery 112. The battery holder 204 is arranged on a second end portion 214 of the vehicle battery 112, wherein the first 212 and second 214 end portions are positioned on opposite sides of the vehicle battery 112 as seen in the longitudinal direction thereof. Further details with regards to the protruding portion 210 of the vehicle battery arrangement 202 will also be given below in relation to the description of FIGS. 4a and 4b.

Furthermore, the vertical cab frame structure 205 may also comprising guiding rails (not shown) which are arranged in conjunction with corresponding guiding structure (not shown) on the battery arrangement 202. Hereby, the battery arrangement 202 can be guided to its correct position. The guiding rails and guiding structure may, for example, be formed by longitudinally extending grooves or protrusions.

Figure 3:
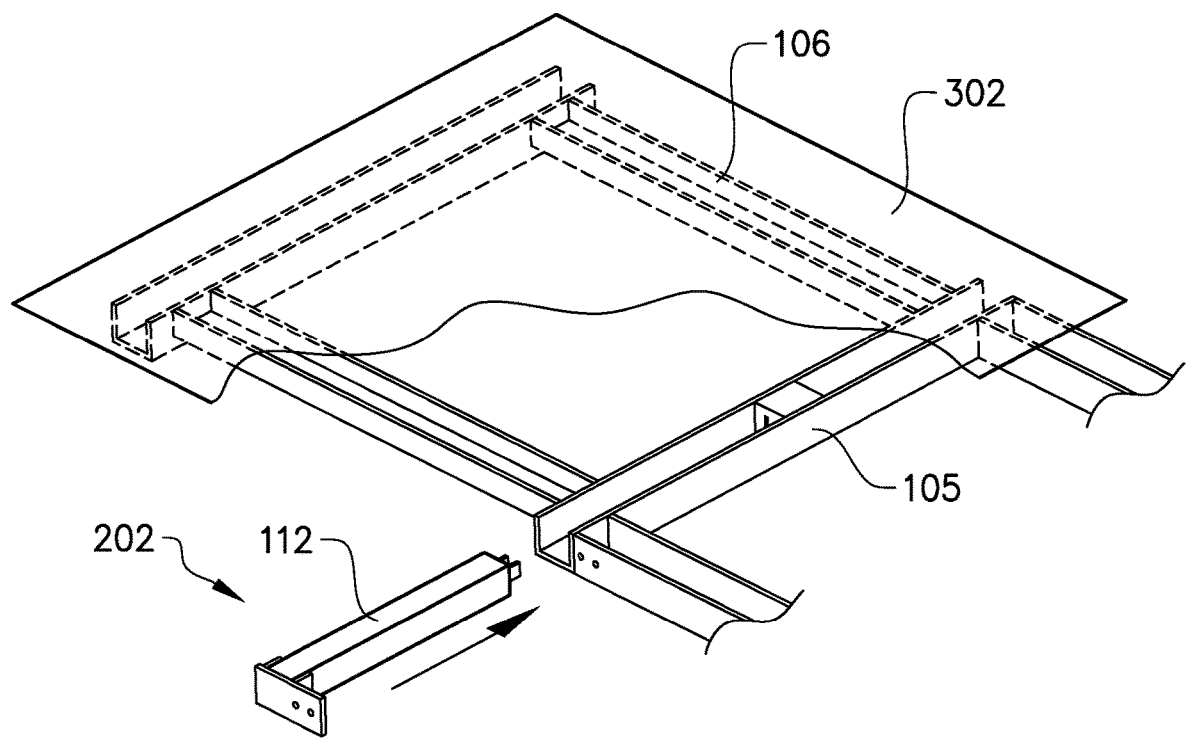
FIG. 3 is a perspective view of an example embodiment of a frame structure of the roof structure of the vehicle in which a vehicle battery can be arranged.

With reference to FIG. 3, another alternative position for the vehicle battery 112 is depicted. In FIG. 3, the vehicle battery 112, and thus also the vehicle battery arrangement 202, is connected to the vehicle roof structure 106. The vehicle roof structure 106 is, in the example embodiment, constituted by U-shaped cab frame structures. When the battery arrangement 202 is positioned in the vehicle roof structure, the U-shaped cab frame structure in conjunction with the roof panel 302 encapsulates, i.e. houses the vehicle battery 112. The vehicle battery arrangement 202 depicted in FIG. 3 is similar to the vehicle battery arrangement 202 depicted in FIG. 2. However, since the roof panel 302 will encapsulate the vehicle battery 112, the use of a lid 208 as depicted in FIG. 2 is not required. Hence, the roof panel 302 will act as a lid and thus encapsulate the vehicle battery.

Figure 4A:
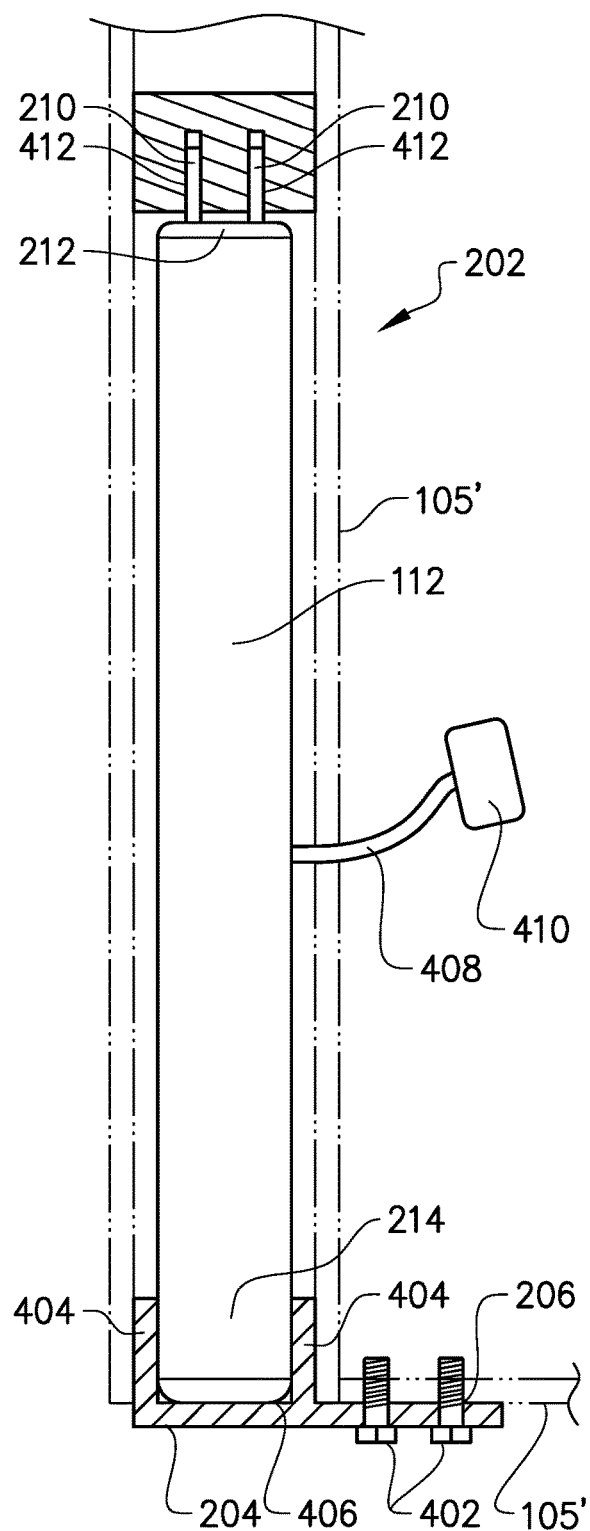
FIGS. 4a and 4b illustrate exemplary attachments of the vehicle battery to the cab body structure.
Figure 4B:
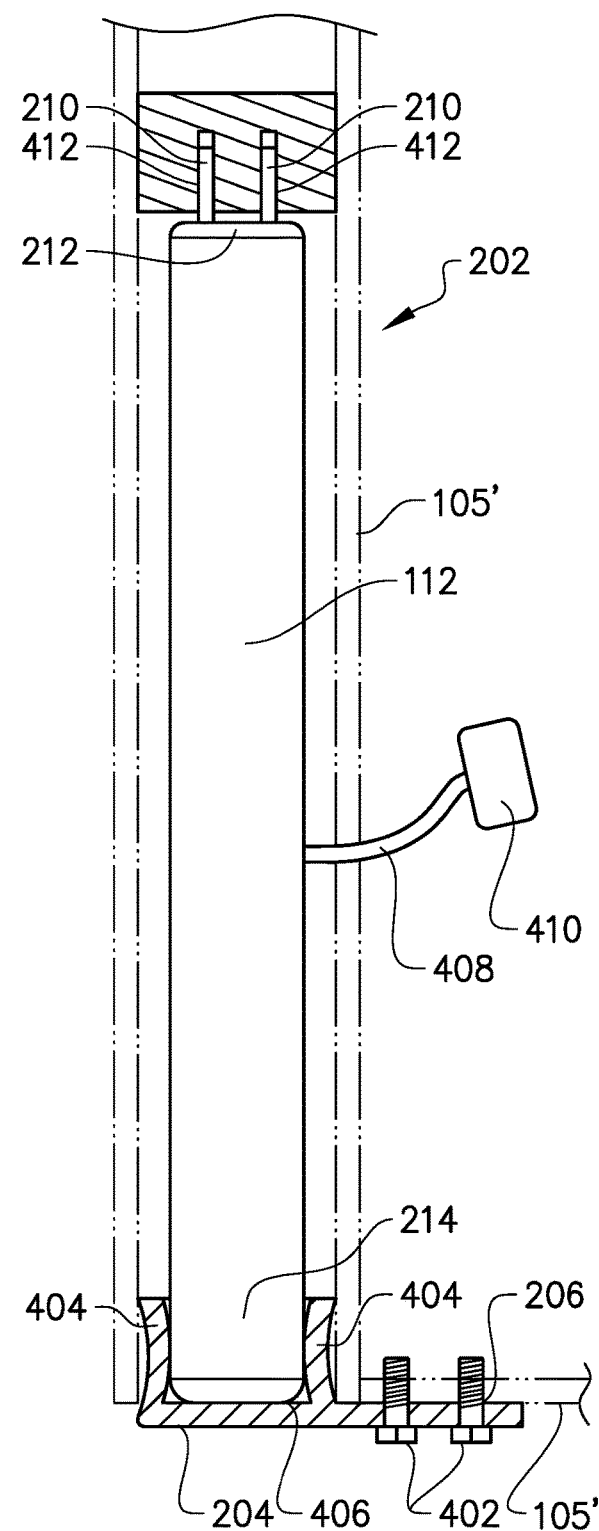

Now, reference is made to FIGS. 4a and 4b which illustrate two different embodiments of the vehicle battery arrangement 202. The main difference between the embodiment depicted in FIG. 4a and the embodiment depicted in FIG. 4b is the interconnection between the vehicle battery 112 and the battery holder 204. In the illustrated embodiments of FIGS. 4a and 4b, the vehicle battery arrangement 202 is connected to the cab frame structure 105' of the side wall structure 108. Furthermore, the illustrations in FIGS. 4a and 4b depicts the vehicle battery 112 when being assembled to the cab body structure.

Starting with FIG. 4a, the vehicle battery arrangement 202 is connected to the cab frame structure 105' by means of bolts 402 connecting the battery holder 204 to the cab frame structure 105' through the bolt boles 206. The battery holder 204 further comprises a pair of vertical flanges 404 housing the second end portion 214 of the vehicle battery 112. Although not depicted in FIG. 4a, one or more fixation bolts may be arranged to connect the vertical flanges 404 to the vehicle batter 112. Hence, these fixation bolts pass through the vertical flanges 404 as well as the vehicle battery 112. The battery bolder may also comprise a circumferentially arranged vertical flange instead of the pair of vertical flanges, which reduces the need of fixation bolts between the vertical flanges 404 and the vehicle battery 112. Also, the battery holder 204 comprises a substantially horizontal contact surface 406 between the pair of vertical flanges 404. The substantially horizontal contact surface 406 is thus arranged approximately perpendicular to the pair of vertical flanges 404. Furthermore, and as depicted in further detail in FIGS. 5a and 5b, the vehicle battery 112 may comprise a first guiding means which has a corresponding shape as a second guiding means on the battery holder 204 for allowing connection there between.

Furthermore, the vehicle battery arrangement 202 comprises a connector arrangement 408 provided with a power connector 410 for connecting the vehicle battery 112 to electrical power consumers of the vehicle 100, such as e.g. fuse and relay center of the starter motor (not shown) of the engine or any other type of vehicle actuator. In the illustrated embodiment, the connector arrangement 408 is an electrical cable connected to the vehicle battery 112 through an opening of the cab frame structure 105'. The cable may be provided as a separate insulated conductor connected to the battery by means of power connector in the battery, or may be permanently connected to the vehicle battery. The cable pulling may be arranged through already existing openings of the cab frame structure or through specially adapted openings.

Moreover, the vehicle battery arrangement 202 further comprises, protruding portions 210 in the form of ground terminals. The protruding portions 210 are arranged at the first end portion 212 of the vehicle battery 112. The protruding portions 210 are arranged to be connected to a recess portions 412 arranged in the vehicle cab frame structure 105'. The recess portions 412 may thus be arranged as an electrical ground terminal for the ground terminals of the vehicle battery 112. Although FIG. 4a depicts vertical protruding portions 210, these protruding portions may be arranged in other shapes as well, such as substantially perpendicular to the extension of the vehicle battery 112. In such a case, the protruding portions may be connected to a substantially horizontal recess portions by means of e.g. a bayonet coupling or the like. Furthermore, the protruding portions 210 may be arranged at the first end portion 212 as well as the second end portion 214 of the vehicle battery 112. Hence, one of the protruding portions 210 is arranged at the first end portion 212 and one of the protruding portions 210 is arranged at the second end portion 214. Hereby, the risk of damaging both of the protruding portions 210 is reduced as they are not located in the vicinity of each other. Furthermore, the battery may also be grounded directly to the cab structure, thus reducing the need of grounding cables, etc.

Turning to FIG. 4b, the pair of vertical flanges 404 of the battery holder is arranged in a substantially concave shape. The vertical flange 404 in FIG. 4b is flexible and thus arranged to provide a pre-tension to the vehicle battery 112. Thus, no bolt connection between the flanges and the vehicle battery 112 is needed. The vehicle battery 112 may also be provided with a recess portion, such as a corresponding concave shape, for providing a form fit between the vertical flexible flanges 404 and the vehicle battery 112 at the second end portion 214 of the vehicle battery 112.

Figure 5A:
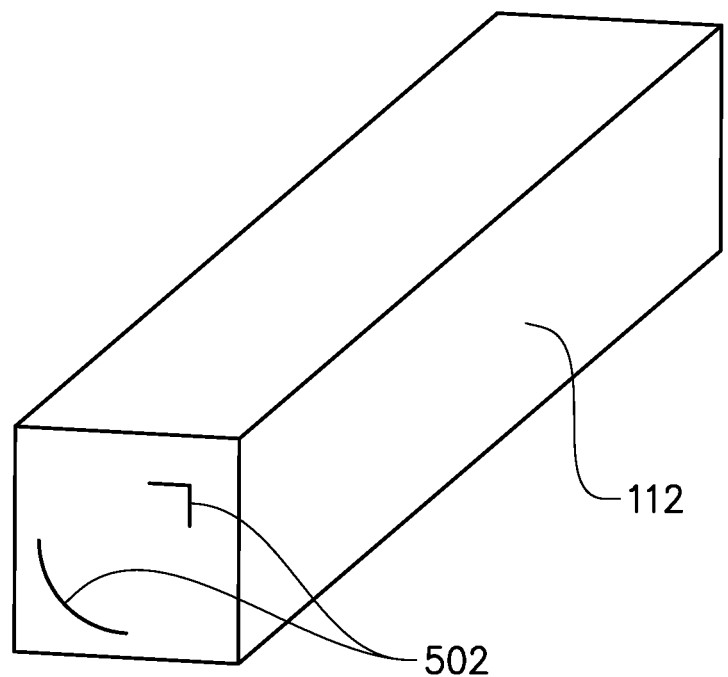
FIGS. 5a and 5b illustrate an exemplary embodiment of guiding means arranged on the vehicle battery and the battery holder.
Figure 5B:
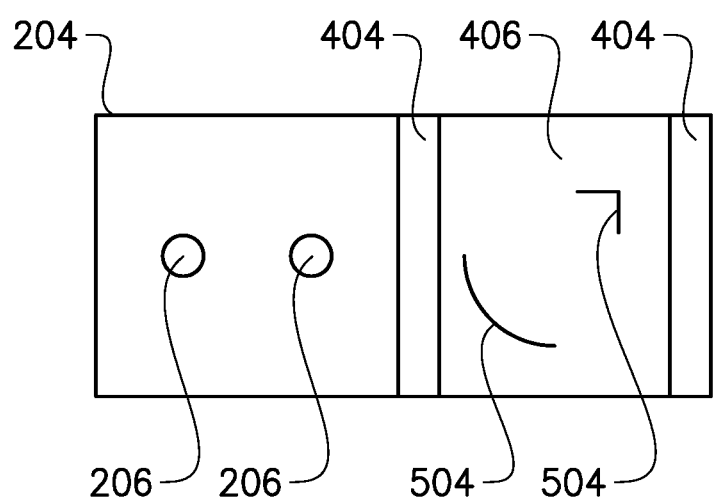

Turning, to FIGS. 5a and 5b, which illustrate an exemplary embodiment of a guiding means arranged on the vehicle battery 112 and the battery holder 204. As depicted in FIG. 5a, the vehicle battery 112 comprises the above defined first guiding means 502. The first guiding means 502 may be arranged as a protruding portion having a specific shape. The first guiding means 502 may also be arranged in a concave or a convex shape. Further, the battery holder 204, which in FIG. 5b is depicted perpendicular in comparison to FIGS. 4a and 4b, comprises a second guiding means 504 at the substantially horizontal contact surface 406. The second guiding means 504 may be arranged as a recess portion having a specific shape corresponding to the shape of the first guiding means 502. The second guiding means 504 may also be arranged in a concave or a convex shape. Providing first 502 and second 504 guiding means having corresponding shapes provide a form fit between the vehicle battery 112 and the battery holder 204. It should thus be understood that if the first guiding means 502 has a convex shape then the second guiding means 504 should have a concave shape, and vice Versa. Likewise, the first guiding means 502 may be arranged as a recess portion if the second guiding means 504 is arranged as a protruding portion.

Figure 6:
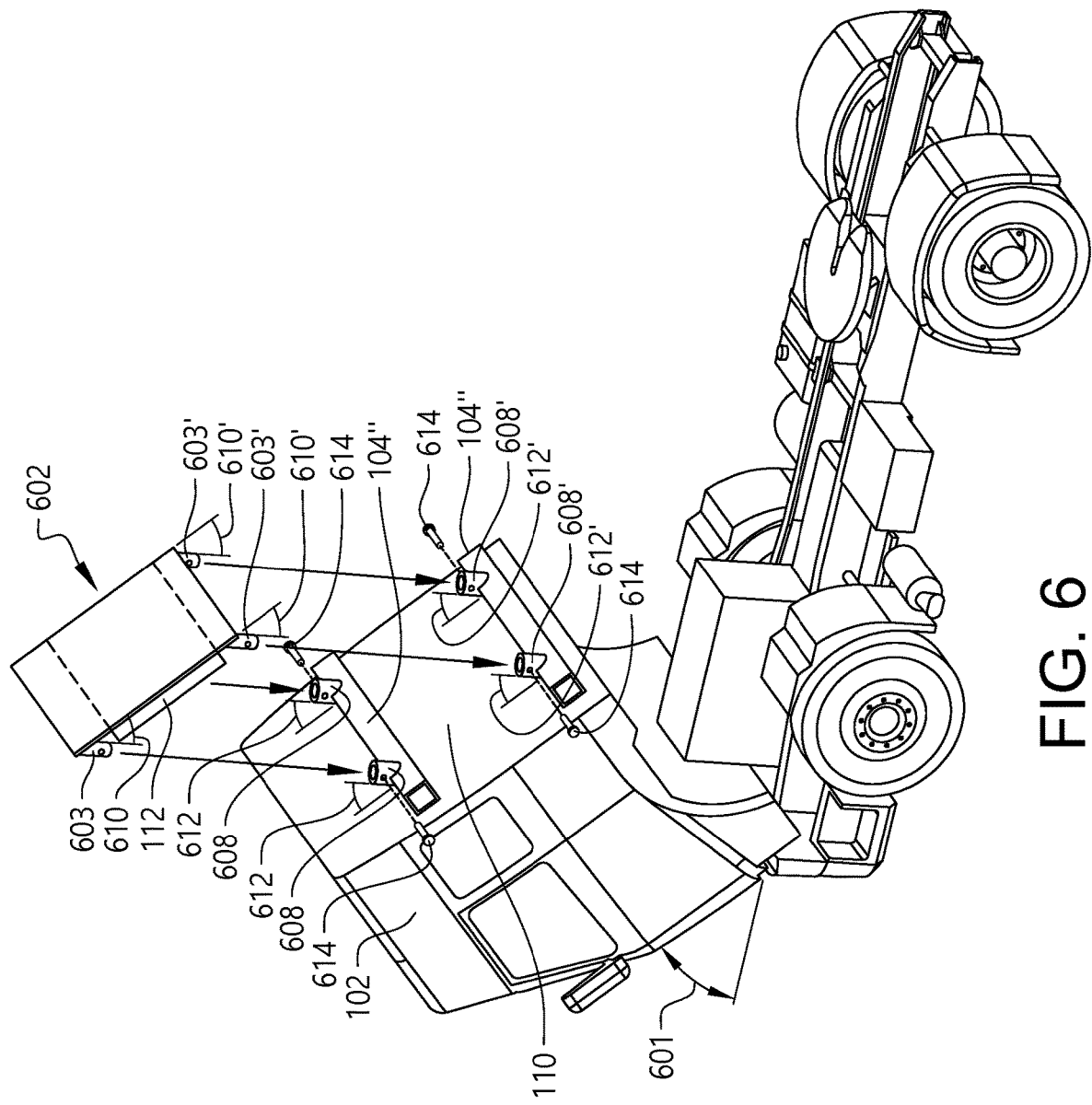
FIG. 6 is a perspective view of a vehicle and vehicle cab body according to another example embodiment.

Reference is now made to FIG. 6 which illustrates a vehicle comprising a vehicle cab body 102 according to yet another example embodiment. The vehicle depicted in FIG. 6 comprises a tillable vehicle cab body 102 for maintenance of components there under. The vehicle cab body 102 is tiltable up to a maximum tilt angle 601 defined by the angle between a horizontal plane and plane defined by the grille of the vehicle cab body 102.

As can be seen in FIG. 6, the vehicle battery arrangement 602 comprises the vehicle battery 112. The vehicle battery arrangement 602 comprises connection pins 603, 603, wherein the connection pins 603, 603' may be connected to a battery holder or battery lid of the vehicle battery arrangement. The vehicle battery arrangement 602 comprises a first set of connection pins 603 at an upper portion of the vehicle battery arrangement 602 and a second set of connection pins 603' at a lower portion of the vehicle battery arrangement 602. These connection pins 603, 603' are arranged to interconnect the vehicle battery arrangement to the vehicle cab body 102. More particularly, the vehicle cab body 102 comprises an upper horizontal frame structure 104" and a lower horizontal frame structure 104" positioned at the rear wall structure 110 of the vehicle cab body 102, whereby the connection pins 603, 603' are connected to an upper 608 and a lower 608' recess portion of the upper 104" and lower 104" horizontal frame structures, respectively. Hereby, the vehicle battery is positioned between the upper 104" and lower 104" horizontal frame structures of the vehicle cab body 102. It should be understood that the upper 104" and lower 104" horizontal frame structures must not be arranged on are outside surface of the rear wall structure 110, which is merely illustrated for simplicity of understanding. Hence, the upper 104" and lower 104" horizontal frame structures are preferably arranged at an inner side of the rear wall structure 110.

The connection pins 603, 603' are preferably, and as depicted in FIG. 6, angled relative to a plane defined by the rear wall structure 110 when attached thereto. Similarly, the recess portions 608, 608' may also be angled relative to the plane defined by the rear wall structure 110. The angle 610, 610' of the connection pins 603, 603' and the angle 612, 612' of the recess portions 608, 608' are preferably arranged with the same angle value. The angle 610, 610' of the connection pins 603, 603' and the angle 612, 612' of the recess portions 608, 608' may be in the range between 20-60 degrees. The angles 610, 610', 612, 612' may also be approximately similar to the maximum tilt angle 601 of the vehicle cab body 102. In the latter case, the connection pins 603, 603' will extend in a substantially vertical direction before connected to the corresponding recess portions 608, 608', thus simplifying assembling thereof. Other angles are of course conceivable and dependent on the specific application.

By means of the angled connection pins 603, 603', the vehicle battery arrangement 602 can, be kept in position at the recess portions 608, 608 merely by means of the downwardly directed force component from the mass of the battery. However, the connection pins 603, 603' may be provided with attachment means 614 for further securing the connection to the recess portion 608, 608'. The attachment means 614 may, for example, be a bolt connected through bolt holts of the recess portion and the connection pins. The attachment means 614 may also be pre-tensioned balls arranged to snap-fit the connection pins 603, 603' to the recess portion 608, 608'.

Although not depicted in FIG. 6, the first 603 and second 603' set of connection pins may also be arranged as respective horizontal beams extending in the transverse direction of the vehicle cab body. In such case, the recess portions 608, 608' are arranged as elongated recess portions in the upper 104" and lower 104" horizontal frame structure, respectively.

Furthermore, the connection pins 603, 603' may also be connected to the battery 112 in such a way as to serve the function of grounding the battery to the vehicle cab body 102. Herby, a plurality of battery packages can be provided, whereby each battery package is connected to a respective connection pin.

The embodiment of the vehicle battery arrangement depicted in FIG. 6 should not be construed as limited to a tillable cab body 102 but should be understood to function equally as well for a non-tiltable cab body.

It is to be understood that the present invention is not limited to the embodiment described above and illustrated in the drawings; rather, the skilled person will recognize that many changes and modifications may be made within the scope of the appended claims. For example, the battery holder 204 may form part of a locking mechanism for a tilted vehicle cab. Hence, the battery holder 204 can serve the function of holding the battery as described above, as well as comprising a locking device for sufficiently connecting the cab structure to the vehicle frame structure in a non-tilted configuration of the cab structure.

The invention claimed is:

1. A vehicle cab body for a vehicle, the vehicle cab body comprising a cab body structure comprising a roof structure, side wall structures, and a rear wall structure, wherein the vehicle cab body further comprises a vehicle battery, wherein a portion of at least one of the roof structure, the side wall structures, and the rear wall structure forms at least a part of a housing for the vehicle battery.

2. The vehicle cab body according to claim 1, wherein the cab body structure comprises a cab reinforcement structure forming at least a part of the housing for the vehicle battery.

3. The vehicle cab body according to claim 2, wherein the cab reinforcement structure is a vehicle cab frame structure arranged on at least one of the roof structure, the side wall structures and the rear wall structure, wherein the vehicle battery is at least partly housed within the vehicle cab frame structure.

4. The vehicle cab body according to claim 1, wherein a lid is provided for encapsulating the vehicle battery within the cab body structure.

5. The vehicle cab body according to claim 1, further comprising at least two cab reinforcing structures, wherein the vehicle battery is at least partly housed between the at least two cab reinforcing structures, such as vehicle cab frame structures.

6. The vehicle cab body according to claim 5, wherein the vehicle battery is at least partly housed between the at least two vehicle cab frame structures on the rear wall structure of the vehicle.

7. The vehicle cab body according to claim 1, wherein the vehicle battery is arranged in the roof structure of the cab body structure.

8. The vehicle cab body according to claim 1, wherein the vehicle battery is arranged in at least one of the side wall structures.

9. The vehicle cab body according to claim 1, wherein the vehicle battery is arranged in the rear wall structure.

10. The vehicle cab body according to claim 2, wherein the vehicle cab body comprises a vehicle battery arrangement comprising the vehicle battery, the vehicle battery arrangement comprising at least one connection pin and the cab reinforcement structure comprising a recess portion, wherein the vehicle battery arrangement is connected to the cab reinforcement structure by connection of the at least one connection pin into the recess portion.

11. The vehicle cab body according to claim 2, wherein the vehicle cab body comprises a vehicle battery arrangement comprising the vehicle battery, the vehicle battery arrangement comprising a protruding portion at a first end portion thereof, wherein the protruding portion connects the vehicle battery to a recess portion arranged at an inner portion of the cab reinforcement structure.

12. The vehicle cab body according to claim 1, wherein the vehicle cab body comprises a battery arrangement comprising the vehicle battery, wherein the vehicle battery arrangement comprises a battery holder at a second end portion thereof, the battery holder being arranged to mechanically couple the vehicle battery to the cab body structure.

13. The vehicle cab body according to claim 12, wherein the vehicle battery arrangement comprises a protruding portion at the second end portion thereof, wherein the protruding portion at the second end portion connects the vehicle battery to a recess portion of the battery holder.

14. The vehicle cab body according to claim 12, wherein the vehicle battery comprises a first guiding means at a first end portion facing the battery holder, wherein the battery holder comprises a second guiding means at a surface facing the first guiding means, wherein the first and second guiding means have corresponding shapes for allowing connection therebetween.

15. The vehicle cab body according to claim 12, wherein the battery holder comprises at least one flexible flange, wherein the vehicle battery is connected to the battery holder by means of the at least one flexible flange.

16. The vehicle cab body according to claim 15, wherein the vehicle battery comprises a recess portion at a second end portion of the vehicle battery for providing a form fit between the recess portion and the at least one flexible flange.

17. The vehicle cab body according to claim 1, wherein the vehicle battery is a solid state battery.

18. A vehicle comprising a vehicle cab body according to claim 1.

19. The vehicle according to claim 18, wherein the vehicle is a heavy duty vehicle.

20. A vehicle battery arrangement comprising a vehicle battery, wherein the vehicle battery arrangement comprises connecting means for connecting the vehicle battery arrangement to a portion of a cab body structure of a vehicle cab body, wherein the vehicle battery arrangement further comprises a battery holder at a second end portion thereof, the battery holder being arranged to mechanically couple the vehicle battery to the cab body structure, wherein the battery holder comprises at least one flexible flange, and wherein the vehicle battery is connected to the battery holder by means of the at least one flexible flange.

21. The vehicle battery arrangement according to claim 20, wherein the vehicle battery arrangement comprises a protruding portion at a first end portion thereof, wherein the protruding portion is arranged to connect the vehicle battery to a recess portion arranged at an inner portion of the cab body structure.

22. The vehicle battery arrangement according to claim 20, wherein the vehicle battery comprises a first guiding means at a first end portion facing the battery holder, wherein the battery holder comprises a second guiding means at a surface facing the first guiding means, wherein the first and second guiding means have corresponding shapes for allowing connection therebetween.

23. The vehicle battery arrangement according to claim 20, wherein the vehicle battery comprises a recess portion at a second end portion of the vehicle battery for providing a form fit between the recess portion and the at least one flexible flange.

* * * * *